(12) United States Patent
Fan et al.

(10) Patent No.: US 10,473,822 B2
(45) Date of Patent: Nov. 12, 2019

(54) OPTICAL ELEMENT

(71) Applicant: Dow Corning Corporation, Midland, MI (US)

(72) Inventors: Fengqiu Fan, Midland, MI (US); Brian R. Harkness, Jr., Midland, MI (US); Junying Liu, Midland, MI (US); Wei Rong, Midland, MI (US); Takeaki Tsuda, Chiba (JP); Michael L. Bradford, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 137 days.

(21) Appl. No.: 15/121,395

(22) PCT Filed: Apr. 7, 2015

(86) PCT No.: PCT/US2015/024626
§ 371 (c)(1),
(2) Date: Aug. 25, 2016

(87) PCT Pub. No.: WO2016/164068
PCT Pub. Date: Oct. 29, 2015

(65) Prior Publication Data
US 2016/0363698 A1    Dec. 15, 2016

Related U.S. Application Data

(60) Provisional application No. 61/977,314, filed on Apr. 9, 2014.

(51) Int. Cl.
*C08G 77/46* (2006.01)
*G02B 1/11* (2015.01)
(Continued)

(52) U.S. Cl.
CPC .............. *G02B 1/11* (2013.01); *C03C 17/30* (2013.01); *C08J 9/28* (2013.01); *C09D 183/04* (2013.01);
(Continued)

(58) Field of Classification Search
CPC ...................................... C08G 77/46
See application file for complete search history.

(56) References Cited

U.S. PATENT DOCUMENTS 3,615,272 A   10/1971  Collins et al.
4,808,653 A    2/1989  Haluska et al.
(Continued)

FOREIGN PATENT DOCUMENTS

JP    59-178749    10/1984
JP    60-086017     5/1985
(Continued)

OTHER PUBLICATIONS

JP63-107122, machine translation.
(Continued)

*Primary Examiner* — Alexandre F Ferre

(57) ABSTRACT

An optical element comprises an antireflective layer that is disposed on and in contact with a substrate. The antireflective layer has a refractive index of greater than 1 to less than 1.41 and has a pore size ranging from greater than 0 to less than 300 nm. The antireflective layer includes an outermost surface having a water contact angle ranging from greater than or equal to 70° to less than or equal to 120° as determined using ASTM 5946-04.

12 Claims, 1 Drawing Sheet

(51) Int. Cl.
  *C03C 17/30* (2006.01)
  *C08J 9/28* (2006.01)
  *C09D 183/04* (2006.01)
  *C09D 183/08* (2006.01)

(52) U.S. Cl.
  CPC ...... *C09D 183/08* (2013.01); *C03C 2217/732* (2013.01); *C03C 2218/116* (2013.01); *C03C 2218/32* (2013.01); *C08J 2201/0502* (2013.01); *C08J 2383/04* (2013.01)

(56) References Cited

U.S. PATENT DOCUMENTS

| | | | |
|---|---|---|---|
| 4,999,397 | A | 3/1991 | Weiss et al. |
| 5,008,320 | A | 4/1991 | Haluska et al. |
| 5,010,159 | A | 4/1991 | Bank et al. |
| 5,063,267 | A | 11/1991 | Hanneman et al. |
| 5,210,160 | A | 5/1993 | Saive et al. |
| 5,290,394 | A | 3/1994 | Sasaki |
| 5,416,190 | A | 5/1995 | Mine et al. |
| 6,197,913 | B1 | 3/2001 | Zhong |
| 6,967,222 | B2 | 11/2005 | Khanarian et al. |
| 7,419,772 | B2 | 9/2008 | Watkins et al. |
| 8,211,248 | B2 | 7/2012 | Marya |
| 8,506,853 | B2 | 8/2013 | Wada et al. |
| 8,790,479 | B2 | 7/2014 | Iwase |
| 9,045,647 | B2 | 6/2015 | Kleyer et al. |
| 2002/0042020 | A1 | 4/2002 | Gallagher et al. |
| 2005/0195486 | A1* | 9/2005 | Sasaki ............. G02B 1/11 359/580 |
| 2006/0046046 | A1 | 3/2006 | Wang et al. |
| 2006/0097151 | A1 | 5/2006 | Seaward et al. |
| 2006/0182945 | A1 | 8/2006 | Yoneyama et al. |
| 2009/0162800 | A1* | 6/2009 | Abdallah ............. G02B 1/111 430/326 |
| 2010/0104851 | A1 | 4/2010 | Weng et al. |
| 2010/0196665 | A1 | 8/2010 | Masuda et al. |
| 2010/0215943 | A1 | 8/2010 | Shinohara et al. |
| 2011/0019277 | A1 | 1/2011 | Sager et al. |
| 2012/0262791 | A1 | 10/2012 | Takahashi et al. |
| 2015/0152271 | A1 | 6/2015 | Bradford et al. |

FOREIGN PATENT DOCUMENTS

| | | | |
|---|---|---|---|
| JP | 63-107122 | 5/1988 | |
| JP | 2000334881 | 12/2000 | |
| JP | 2002113805 | 4/2002 | |
| JP | 2005202240 | 7/2005 | |
| JP | 2005249982 | 9/2005 | |
| JP | 2006145709 | 6/2006 | |
| JP | 2007284622 | 11/2007 | |
| JP | 2011173738 | 9/2011 | |
| TW | 201030108 | 8/2010 | |
| WO | WO-2012064989 A1 * | 5/2012 | ............. C07F 7/14 |

OTHER PUBLICATIONS

JP59-178749, machine translation.
JP60-086017, machine translation.
Search report from corresponding Taiwan 104111087 application, dated Nov. 29, 2018.
Search report from corresponding Japanese 2016-5562261 application, dated Dec. 10, 2018.
Publication List attached to Second Office Action from corresponding Japan 2016-556261 application, dated Aug. 19, 2019.

* cited by examiner

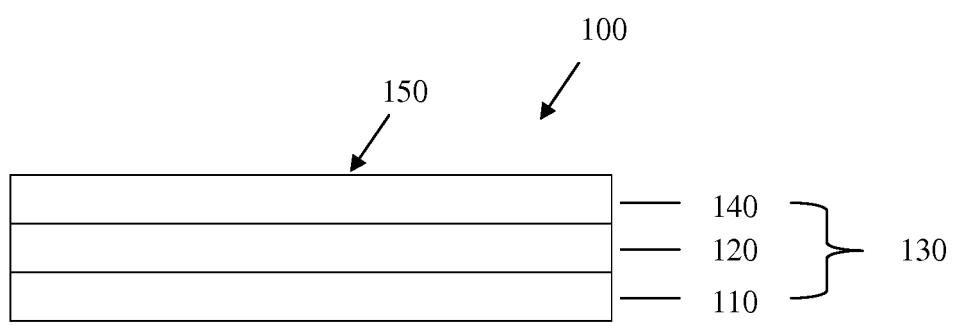

OPTICAL ELEMENT

CROSS REFERENCE TO RELATED APPLICATIONS

This application is a U.S. national stage filing under 35 U.S.C. § 371 of PCT Application No. PCT/US2015/024626 filed on Apr. 7, 2015, which claims the benefit of U.S. Provisional Patent Application No. 61/977,314 filed Apr. 9, 2014, under 35 U.S.C. § 119(e). PCT Application No. PCT/US2015/024626 and U.S. Provisional Patent Application No. 61/977,314 are hereby incorporated by reference.

Some exemplary embodiments of the present invention generally relate to an optical element. The optical element comprises an antireflective layer disposed on and in contact with a substrate and having a refractive index of greater than 1 to less than 1.41. In addition, the antireflective layer has an outermost surface having a water contact angle ranging from greater than or equal to 70 degrees (°) to less than or equal to 120° as determined using a modified version of ASTM 5946-04.

A transparent substrate made of glass, ceramic or plastic is used as a display of, for example, a personal computer, a television, a portable terminal or the like (which collectively or alternatively may be referred to herein as optical elements). Optical elements that are touch-sensitive in operation also are becoming increasingly more common. The use of touch sensitive optical elements as the preferred human interface of gaming devices, music playback devices, tablet computers, mobile devices, control panels in airplanes, and other devices is increasing. We recognize that when light is reflected at a surface of the optical element, display content is difficult to be optically recognized. Specular and diffuse reflection can be particularly problematic for certain optical elements and their associated uses.

In addition to the issues in providing the desired optical properties for optical elements, we know that the surfaces of such optical elements are susceptible to staining and smudging, oftentimes due to oils from hands and fingers. For example, optical elements including an interactive touch-screen display, e.g. smart phones, may be smudged with fingerprints, skin oil, sweat, cosmetics, etc., when used. These stains and/or smudges adhere to the surfaces of the optical elements and are not easily removed. Moreover, such stains and/or smudges may decrease the usability of these optical elements.

To address many of these issues, our desire for the surface of these optical elements is to provide desired antireflective properties. Also, outer surfaces of these optical elements may be provided with properties to decrease their susceptibility to staining and smudging. For example, in certain instances, a coating layer may be applied to the outer surfaces of these optical elements to provide antireflective properties while reducing staining or smudging. However, techniques for applying such coatings, such as by vapor deposition, are expensive and utilize specialized deposition equipment.

We recognize that there remains a need for improving the antireflective properties and outer surface characteristics for these optical elements.

BRIEF SUMMARY OF SOME EMBODIMENTS OF THE INVENTION

Some exemplary embodiments of the present invention provide an optical element comprising a substrate and an antireflective layer disposed on and in direct contact with the substrate.

The antireflective layer has a refractive index ranging from greater than 1 to less than 1.41 and has a pore size ranging from greater than 0 to less than 300 nm. In addition, the antireflective layer has an outermost surface having a water contact angle ranging from greater than or equal to 70° to less than or equal to 120° as determined using a modified version of ASTM 5946-04.

Other exemplary embodiments of the present invention provide an associated method for forming the optical element as described in the previous paragraph comprising:

(I) applying a silicon-based resin on the substrate;

(II) oxidatively curing the silicon-based resin on the substrate to form a first layer disposed on and in direct contact with the substrate, the first layer having a pore size ranging from greater than 0 to less than 300 nm; and (III) disposing an outermost layer on and in direct contact with the first layer such that the first layer is between the substrate and the outermost layer.

The antireflective layer has high light transmittance, thereby improving anti-glare properties of the optical element. In addition, the outermost surface of the antireflective layer provides a low friction and hydrophobic surface that resists smudging during the repeated contact with foreign objects such as, for example, the human finger. The outermost surface of the antireflective layer may be easily cleaned by wiping with a cloth or the like while retaining its light transmission properties and other characteristics as described above.

These and other aspects, advantages, and salient features will become apparent from the following detailed description, the accompanying drawing, and the appended claims.

BRIEF DESCRIPTION OF THE DRAWINGS

FIG. 1 is a cross-sectional view of an optical element including an antireflective layer disposed on a substrate.

DETAILED DESCRIPTION OF THE INVENTION EMBODIMENTS

The articles 'a', 'an', and 'the' each refer to one or more, unless otherwise indicated. All amounts, ratios, and percentages in this application are by weight, unless otherwise indicated.

The Summary and accompanying Abstract are hereby incorporated here by reference. Some exemplary embodiments of the present invention generally relate to optical elements that may be used in, or constitute, photovoltaic devices, storefront windows, display cases, picture frames, other types of windows, touch screen panel or mobile phone touch screen panels, and the like. As used herein, the term "window" collectively may refer to any transparent material or substrate that may be used in optical elements, including the afore-mentioned storefront windows and transparent materials or substrates used in the afore-mentioned display cases, picture frames, touch screens and the like.

The optical element includes an antireflective (AR) layer disposed on and in contact with a substrate. The AR layer may be provided on either the light incident side or the other side of the substrate (e.g., glass substrate), or on both the light incident side and the other side of the substrate. Referring to the latter embodiment, two AR layers may be provided so that there is a first AR layer on the light incident side and a second AR layer on the other side of the substrate.

This AR layer may function to reduce reflection of light from the substrate, thereby allowing more light within the solar spectrum to pass through the light incident side of the substrate so that the device can be more efficient. The substrate may be a superstrate, such as a glass superstrate, or any other type of superstrate or substrate in different instances. In addition, the AR layer has an outermost surface that provides a low friction and hydrophobic surface that may resist smudging or staining during the repeated contact with foreign objects such as, for example, the human finger (and oils and dirt that may be transferred therefrom). In addition, because such oils and dirt do not easily adhere to this low friction and hydrophobic surface, such oils and dirt may be easily removed from the surface by wiping with a cloth or the like. Stated another way, the low friction and hydrophobic surface outer surface of the AR layer is an easy to clean surface.

Referring to the drawing in general and to FIG. 1 in particular, the illustration is for the purpose of describing particular embodiments and is not intended to limit the disclosure or appended claims thereto. The drawing is not necessarily to scale, and certain features of the drawing may be shown exaggerated in scale or in schematic in the interest of clarity and conciseness.

As used herein, the terms "contact angle" and "CA" refer to the angle tangent at the point where a liquid drop contacts a medium (a substrate or layer coated onto a substrate). The term "water contact angle" and "WCA" refer to the angle tangent at the point where a water drop contacts a substrate or layer coated onto the substrate. The WCA therefore relates to how the water applied to the medium interacts with the surface of the substrate or layer coated onto the substrate and is not a property of the substrate or coated layer itself. Thus, when a surface of the medium is described as having a water contact angle of X°, it is referring the angle tangent at the point where a liquid drop contacts the surface.

The term "refractive index", as in the "refractive index" of the coating layer or substrate, is a dimensionless number that describes how light, or any other radiation, propagates through that substrate or coating layer. In other words, the refractive index compares the speed of light in a vacuum versus the speed of light through the coating layer or substrate. For example, the refractive index of water is 1.33, meaning that light travels 1.33 times slower in water than it does in vacuum. The "refractive index" does not describe a characteristic property of the substrate or the coating layer.

The term "substrate" as used herein includes, but is not limited to, glass articles, including windows, cover plates, screens, panels, and substrates that form the outer portion of a display screen, window, or structure for mobile electronic devices. When used to describe a substrate and wetting characteristics of said substrate, the terms "hydrophobic" and "hydrophobicity" refer to the state in which the contact angle between a substrate and a water droplet is greater than 90° (up to 180°). Similarly, the terms "oleophobic" and "oleophobicity" refer to a state in which the contact angle between a substrate and an oil droplet, or between a layer on the substrate and an oil droplet, is greater than 60° (up to 180°).

Some of the embodiments of the optical element may be described in further detail in order to illustrate some of the contemplated elements and/or features thereof. Referring now to FIG. 1, an optical element 100, in accordance with one exemplary embodiment, is illustrated and includes a substrate 110 and an AR layer 130 disposed on and in contact with the substrate 110.

The substrate 110 typically provides mechanical support to the optical element 100. For example, the substrate 110 may provide protection to a front surface of the optical element 100. Similarly, the substrate 110 may provide protection to a back surface of the optical element 100, depending on orientation of the optical element 100. The substrate 110 may be soft and flexible or may be rigid and stiff. Alternatively, the substrate 110 may include rigid and stiff segments while simultaneously including soft and flexible segments. The substrate 110 may be load bearing or non load bearing and may be included in any portion of the optical element 100. The substrate 110 may be a "top layer," also known as a superstrate. The substrate 110 may be used to protect optical element 100 from environmental conditions such as rain, snow, and heat.

The substrate 110 is not particularly limited in composition and may be, include, consist essentially of, or consist of, glass, metal, wood, plastic, ceramics, and/or silicone, e.g. linear and/or branched polyorganosiloxanes, so long as it/they provide the desired optical properties. In one embodiment, the substrate 110 is, includes, consists essentially of (and does not include organic monomers or polymers or silicones), or consists of, glass (e.g. an amorphous soda-lime glass). The substrate 110 is not particularly limited in dimensions such as length, width and/or thickness.

The AR layer 130 allows the transmission of light through the substrate 110 and AR layer 130 and provides the optical element 100 with reduced reflectance and improved durability properties, including, for example, scratch resistance. In addition, the AR layer 130 also provides a low friction and hydrophobic outer surface 150 that aids in resisting smudging during the repeated contact with foreign objects such as, for example, the human finger. The AR layer 130 may therefore be wiped with cloth to retain its light transmission properties.

Still further, the AR layer 130 has a refractive index ranging from greater than 1 to less than 1.41. In certain embodiments, the AR layer 130 has an average reflectance of from >0% to less than about 4% from 400 nm to 800 nm and an average transmittance of more than 94% (e.g., from >94% to 100%, alternatively from >94% to <100%, alternatively from >94% to 99.9%) from 400 nm to 800 nm. In certain embodiments, the light transmittance in the visible spectrum through the AR layer 130 ranges from greater than 85% to 100%, alternatively from >85% to <100% (e.g., from >85% to <99.9%). In certain embodiments, the haze value through the AR layer 130 ranges from 0% to less than 15%, alternatively from >0% to <15%, alternatively from 0.1% to <15%. In still further embodiments, the AR layer 130 provides a combination of one or more of these optical properties.

In certain embodiments, such as illustrated in FIG. 1, the AR layer 130 includes a first layer 120 and a second layer 140, or outermost layer 140, disposed on and in contact with the first layer 120. In these embodiments, the first layer 120 is positioned between the substrate 110 and the outermost layer 140. The outermost layer 140 includes an outermost surface 150.

In certain embodiments, the outermost layer 140 is distinct and separate from the first layer 120. Stated another way, there is no covalent bonding between the first layer 120 and the second layer 140, and thus the outermost surface 150 is defined as a portion of the outermost layer 140. Alternatively, the outermost layer 140, after application, forms one or more covalent bonds with the first layer 120 and thus can be considered to be a part of, or integral with, the first layer 120. In either embodiment, the outermost surface 150 is defined as the outermost surface of the AR layer 130.

The first layer 120 includes an oxidatively cured product of a silicon-based resin. Said differently, the first layer 120 may include, be, consist essentially or, or consist of, the chemical product that exists after the silicon-based resin is oxidatively cured. For example, the terminology "consist essentially of" may describe an embodiment that is free of a non-cured silicon-based resin and/or an organic polymer. The first layer 120 can be a single layer, a bi-layer, or a multi-layer coating. The first layer 120 may be any suitable thickness in certain exemplary embodiments that achieves the desired antireflective properties and durability properties. In certain embodiments, the thickness of the first layer 120 (or alternatively in certain embodiments the thickness of the AR layer 130), ranges from 50 nm to 1000 nm, alternatively from 75 nm to 500 nm.

In addition, in certain embodiments, the first layer 120 has a refractive index ranging from greater than 1 to less than 1.41. In addition, in certain embodiments, the first layer 120 has a pore size of greater than 0 to less than 300 nm, alternatively from 1 to <300 nm. In still other embodiments, the first layer 120 has both a refractive index ranging from greater than 1 to less than 1.41 and a pore size of greater than 0 to less than 300 nm.

The silicon-based resin of the first layer 120 in any of these embodiments may be, or may be chosen from, a silsesquioxane, a polysilsesquioxane, a silazane or a polysilazane, or combinations thereof. Alternatively, the silicon-based resin may be a silsesquioxane having the formula:

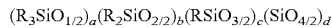

wherein each R is independently chosen from hydrogen, alkyl, alkenyl, and aryl groups or alkyl, alkenyl, and aryl groups substituted with halogen, nitrogen, oxygen, sulfur or silicon atoms, with the proviso that at least two R groups are hydrogen (i.e., the silsesquioxane may alternatively be referred to as a hydrogen silsesquioxane), wherein a, b, c and d are mole fractions, wherein a+b+c+d is 1, and wherein the sum of c and d is greater than zero. Non-limiting examples of alkyl groups are methyl, ethyl, propyl, butyl, e.g. having 1 to 6 carbon atoms. Non-limiting examples of alkenyl groups include vinyl, allyl and hexenyl. Non-limiting examples of aryls include phenyl. Non-limiting examples of substituted groups include $CF_3(CF_2)_nCH_2CH_2$, where n is 0 to 6.

Hydrogen silsesquioxane includes random network linkages and has a general chemical composition of $(HSiO_{3/2})_n$ wherein n is a positive integer. When cured under oxidative conditions, the hydrogen silsesquioxane is driven toward $SiO_2$. Hydrogen silsesquioxane is utilized herein because Si—H bonds react with silanol groups on the substrate 110 if the substrate 110 is glass. Moreover, hydrogen silsesquioxane forms transparent films which are useful in many applications.

In various embodiments, the first layer 120 may be, consist essentially of, or consist of, the oxidatively cured product of hydrogen silsesquioxane. The terminology "consist essentially of" describes an embodiment wherein the first layer 120 is free of polymers that are not the oxidatively cured product of hydrogen silsesquioxane. However, in this embodiment, and in general, the first layer 120 may include hydrogen silsesquioxane that is not cured. For example, in various embodiments, the first layer 120 includes 0.01, 0.05, 0.1, 0.5, 1, 2, 3, 4, 5, 6, 7, 8, 9, 10, 15, 20, or 25, weight percent of uncured or partially cured hydrogen silsesquioxane. It is contemplated that, in one embodiment, the first layer 120 may "be" the oxidatively cured product of hydrogen silsesquioxane and include (approximately) zero, 0.01, 0.05, 0.1, 0.5, 1, 2, 3, 4, or 5 weight percent of uncured or partially cured hydrogen silsesquioxane. In additional embodiments, any value, or range of values, both whole and fractional, within or between any one or more values described above are contemplated.

Upon curing, the hydrogen silsesquioxane typically forms Si—O bonds in a network structure, as is appreciated in the art. For example, the hydrogen silsesquioxane may start in a cage form (a) and progress to a network form (b), as shown below.

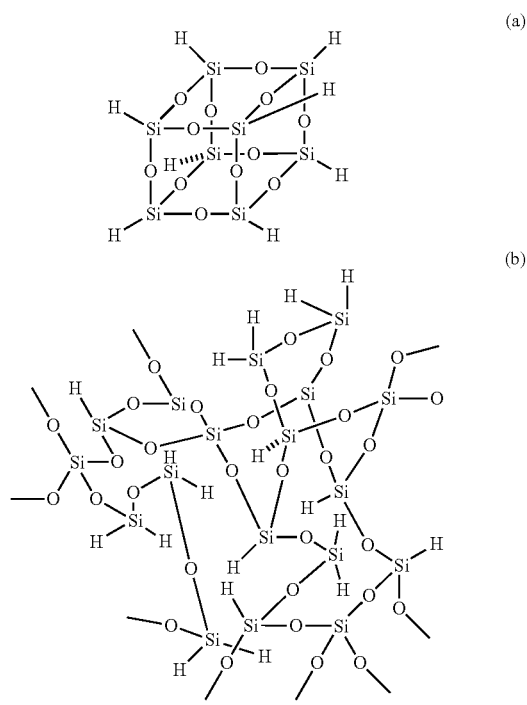

In one embodiment, the silicon-based resin is a hydridosiloxane resin including units of the formula: $HSi(OH)_x(OR)_yO_{z/2}$. In this formula, each R is as defined above. When these R groups are bonded to silicon through the oxygen atom, they form a hydrolyzable substituent. In the above formula, x is 0 to 2; y is 0 to 2; z is 1 to 3; and the sum of x+y+z is 3. These resins may be fully condensed $(HSiO_{3/2})_n$, where n is 8 or greater. Alternatively, these silicon-based resins may be only partially hydrolyzed (i.e., including some Si—OR groups) and/or partially condensed (i.e., including some Si—OH groups).

The structure of the silicon-based resin is not specifically limited. The structure of the resin may be what is generally known at ladder-type, cage-type or mixtures thereof. The silicon-based resin may contain end groups such as hydroxyl groups, triorganosiloxy groups, diorganohydrogensiloxy groups, trialkoxy groups, dialkoxy groups and others. Although not represented by the structure, the silicon-based resin may also contain a small number (e.g. less than about 10%) of the silicon atoms which have 0 or 2 hydrogen atoms attached thereto and/or a small number of SiC groups such as $CH_3SiO_{3/2}$ or $HCH_3SiO_{2/2}$ groups.

The silicon-based resin may be as described in one or more of U.S. Pat. Nos. 3,615,272, 5,010,159, 4,999,397, 5,210,160, 5,063,267, 5,416,190, and/or Kokai Patent Nos. 59-178749, 60-86017 and 63-107122.

In various embodiments, the silicon-based resin has a number average molecular weight from 600 to 150,000, from 1,000 to 150,000, from 10,000 to 150,000, from 20,000 to 140,000, from 30,000 to 130,000, from 40,000 to 120, 000, from 50,000 to 110,000, from 60,000 to 100,000, from 70,000 to 90,000, or from 80,000 to 90,000, g/mol and has at least two silicon-bonded hydrogen (Si—H) groups per molecule, alternatively from 2 to 10 Si—H groups per molecule. In additional embodiments, any value, or range of values, both whole and fractional, within or between any one or more values described above are contemplated.

In various embodiments, specific molecular weight fractions of the silicon-based resin may be used. For example, at least 75% of the polymeric species may have a molecular weight above about 1200 g/mol. In one embodiment, at least 75% of the polymeric species have a number average molecular weight between about 1200 and about 100,000, g/mol.

The terminology "oxidatively cured", as used herein, describes any condition that will cause the conversion of Si—H to Si—O in the presence of oxygen. The terminology "oxidatively cured" may describe partial or complete oxidative curing. As further described herein, the term "partial oxidative curing" describes wherein less than all of the available Si—H groups are converted to Si—O in the presence of oxygen, whereas the term "complete oxidative curing" describes wherein virtually all of the available Si—H groups are converted to Si—O groups.

In certain embodiments, the term "partial oxidative curing" describes wherein at least 30 mole percent less than about 90 mole percent, such as at least 50 mole percent and less than about 90 mole percent, such as at least 70 mole percent less than about 90 mole percent, of the available Si—H groups are converted to Si—O groups. The term "complete oxidative curing" describes wherein virtually all of the available Si—H groups are converted to Si—O groups, such as at least 90 mole percent, such as at least 95 mole percent, up to 100 mole percent, alternatively up to 99.9 mole percent of the available Si—H groups are converted to Si—O groups.

Ceramic oxide precursors may also be used in combination with the hydrogen silsesquioxane resin and/or silicon-based resin. The ceramic oxide precursors include but are not limited to compounds of various metals such as aluminum, titanium, zirconium, tantalum, niobium and/or vanadium as well as various non-metallic compounds such as those of boron or phosphorous which may be dissolved in solution, hydrolyzed and subsequently pyrolyzed at relatively low temperature to form ceramic oxides. Additional non-limiting ceramic oxide precursors are described in U.S. Pat. Nos. 4,808,653, 5,008,320 and 5,290,394.

In certain embodiments, the coating composition of the first layer 120 is applied to the substrate 110 as a solvent dispersion, and thus includes a solvent. The solvent is generally present in an amount sufficient to dissolve/disperse the silicon-based resin to the concentration desired for application. Typically the solvent is present in an amount of 20 to 99.9 wt %, preferably from 70 to 99 wt % based on the weight of silicon-based resin and solvent.

In certain embodiments, at least 5 volume %, such as at least 10 volume %, such as at least 15 volume %, such as at least 25 volume %, and in some embodiments up to 50 volume %, of the solvent remain in the applied coating of the first layer 120 until the silicon-based resin exposed to an oxidizing environment, including but not limited to a catalyst capable of causing hydrolysis of the Si—H bond in the presence of water. This remaining solvent forms the pores of the porous network first layer 120 as the silicon-hydrogen bonds are hydrolyzed and condensed, which provides the first layer 120 with the desired antireflective properties.

In one exemplary embodiment, a high boiling point solvent, or porogen, is used alone or as a co-solvent with one or more low boiling point solvents. In this manner, processing the resin dispersion under normal conditions allows for at least 5% residual porogen remaining.

Exemplary porogens to be used in these exemplary embodiments are those with a boiling point above 175 degrees Celsius (° C.), and in some embodiments up to 300° C., alternatively up to 270° C. Examples of such porogens include hydrocarbons, aromatic hydrocarbons, siloxanes, esters; ethers, and the like. Examples of specific porogens which can be used in these exemplary embodiments include saturated hydrocarbons, such as dodecane, tetradecane, hexadecane, etc., unsaturated hydrocarbons such as dodecene, tetradecene, etc., xylenes, mesitylene, 1-heptanol, dipentene, d-limonene, tetrahydrofurfuryl alcohol, mineral spirits, 2-octanol, stoddard solvent, Isopar™ H, diethyl oxalate, diamyl ether, tetrahydropyran-2-methanol, lactic acid butyl ester, isooctyl alcohol, propylene glycol, dipropylene glycol monomethyl ether, diethylene glycol diethyl ether, dimethyl sulfoxide, 2,5-hexanedione, 2-butoxyethanol acetate, diethylene glycol monomethyl ether, 1-octanol, ethylene glycol, Isopar™ L, dipropylene glycol monomethyl ether acetate, diethylene glycol monoethyl ether, N-methylpyrrolidone, ethylene glycol dibutyl ether, gamma-butyrolactone, 1,3-butanediol, diethylene glycol monomethyl ether acetate, trimethylene glycol, triethylene glycol dimethyl ether, diethylene glycol monoethyl ether acetate, alpha-terpineol, n-hexyl ether, kerosene, 2-(2-n-butoxyethoxy) ethanol, dibutyl oxalate, propylene carbonate, propylene glycol monophenyl ether, diethylene glycol, catechol, diethylene glycol monobutyl ether acetate, ethylene glycol monophenyl ether, diethylene glycol dibutyl ether, diphenyl ether, ethylene glycol monobenzyl ether, hydroquinone, sulfolane and triethylene glycol. Hydrocarbon solvents are particularly desirable.

Lower boiling point solvents, as noted above, may also be used in certain exemplary embodiments which will aid in dissolving or dispersing the resin to form a homogeneous liquid mixture without affecting the resulting coating or the substrate.

These lower boiling point solvents can include alcohols such as ethyl alcohol or isopropyl alcohol; aromatic hydrocarbons such as benzene or toluene; branched or linear alkanes such as n-heptane, dodecane or nonane; branched or linear alkenes such as n-heptane, dodecene or tetradecene; ketones such as methyl isobutyl ketone; esters; ethers such as glycol ethers; or siloxanes such a linear (e.g. hexamethyldisiloxane, octamethyldisiloxane and mixtures thereof), cyclic dimethylpolysiloxanes, or mixtures of any of the above solvents.

The coating containing at least 5 volume % porogen is then contacted with a catalyst and water. Examples of basic catalysts include ammonia, ammonium hydroxide, as well as amines. The amines useful herein may be primary amines ($RNH_2$) and/or hydroxylamines ($R_2NOH$), secondary amines ($R_2NH$) and/or tertiary amines ($R_3N$) in which R is independently (1) a saturated or unsaturated aliphatic such as methyl, ethyl, propyl, vinyl, allyl, ethynyl etc., (2) an alicyclic such as cyclohexylmethyl, (3) an aromatic such as phenyl, (4) a substituted hetero atom such as oxygen, nitrogen, sulfur etc. or (5) compounds in which the nitrogen atom is a member of a heterocyclic ring such as quinoline, pyrrolidine or pyridine. In addition, any of the above amine compounds may be substituted with other hydrocarbon and/or hetero containing groups to form compounds such as diamines, amides etc. Finally, it is also contemplated that compounds which are converted to amines under the reaction conditions used would function in an equivalent manner. For example, a compound such as an ammonium salt which yields an amine upon dissolution would provide the desired catalytic effect.

Examples of the specific amines that may be used herein include methylamine, ethylamine, butylamine, allylamine, cyclohexylamine, aniline, dimethylamine, diethylamine, diethylhydroxylamine, dioctylamine, dibutylamine, 1,8-diazabicycloundec-7-ene (DBU), methylethylamine, saccharin, piperidine, trimethylamine, triethylamine, pyridine, diethyl toluidene ethylmethylpropylamine, imidazole, choline acetate, triphenyl phosphene aniline, trimethylsilylimidazole, ethylenediamine, diethylhydroxylamine, triethylenediamine, n-methylpyrolidone etc.

The catalyst can generally be used at any concentration sufficient to catalyze hydrolysis of the silicon-bonded hydrogens without causing physical damage to the coating.

The water to be used in the embodiments can be that present in an ambient environment (e.g., >25% relative humidity), the ambient environment can be supplemented with additional water vapor (e.g., relative humidity up to 100%), water can be used as a liquid, or a compound which generates water under the reaction conditions can be used.

Contact of the coating with the catalyst and water can be accomplished by any means practical or desirable. For instance, the coating can be contacted with vapors of the catalyst and water vapor. Alternatively, the coating can be contacted with the basic catalyst and water in the liquid state. For instance, the coating can be immersed in a basic catalyst solution containing water.

In some exemplary embodiments, the silicon-based resin coating is exposed to an environment comprising the basic catalyst and water in their vapor state. Exposure to the above conditions can be by any practical means. In another embodiment, the silicon-based resin coating is exposed to ammonia and water vapor.

In this embodiment, the substrate 110 including the first layer 120 may, for instance, simply be placed in a container and the appropriate environment introduced therein or, alternatively, a stream of the catalyst and water may simply be directed at the coating.

The method used to generate the catalyst and water environment in this embodiment is also generally not significant. Methods such as bubbling the catalyst (e.g., ammonia gas) through water or ammonium hydroxide solutions (to control the amount of water vapor present), heating a catalyst and water, or heating water and introducing the catalyst gas (e.g., ammonia gas) are all functional herein. It is also contemplated that methods which generate catalyst vapors in situ such as the addition of water to amine salts or the addition of water to a silazane such as hexamethyldisilazane will also be effective.

The exposure in these exemplary embodiments can be at any temperature desired from about room temperature up to about 300° C. Generally, the temperature is in the range of from about 20 up to about 200° C. is desirable with a range of from about 20 up to about 100° C. being desirable.

The resin coating should be exposed to the catalyst and water environment in these exemplary embodiments for the time necessary to hydrolyze the Si—H groups to form silanols (Si—OH groups) and for the silanols to at least partially condense to form Si—O—Si (siloxane) bonds. Generally, exposures of 15 seconds to 120 minutes are utilized, such as from 1 to 60 minutes. If the coatings are to be used as a durable coating layer having antireflective properties, amongst multiple factors, it is generally desirable to have a longer exposure to increase the amount of silanols and siloxane bonds formed, which increases the durability of the first layer 120.

In an alternative embodiment, the coating for forming the first layer 120 is exposed to catalyst and then water in a liquid state. In another exemplary embodiment, the liquid catalyst and water is an ammonium hydroxide solution.

Exposure to the catalyst and water solution in this alternative embodiment may be conducted at any temperature and atmospheric pressure desired. Temperatures of from about room temperature (20°-30° C.) up to about the boiling point of the catalyst solution and atmospheres from below to above atmospheric pressure are all contemplated herein. From a practical standpoint, however, it is desirable that the exposure occur at about room temperature and at about atmospheric pressure.

The silicon-based resin coating in this alternative embodiment is exposed to the catalyst solution in these exemplary embodiments for the time necessary to hydrolyze the Si—H groups to form silanols (Si—OH groups) and for the silanols to at least partially condense to form Si—O—Si (siloxane) bonds. Generally, exposures of 15 seconds to 120 minutes are utilized, such as from 1 to 60 minutes. If the coatings are to be used as a durable coating layer having antireflective properties, it is generally desirable to have a longer exposure as longer exposures tend to increase the amount of silanols and siloxane bonds formed, which increases the durability of the first layer 120.

After the silicon-based resin coating is exposed to one of the above environments, the porogen is then removed from the coating. This can be accomplished by any desired means. For instance, the porogen may be removed by heating.

If desired, the resultant coating can be subjected to a temperature sufficient to convert the coating to a ceramic before, during or after porogen removal to form the first layer 120. Generally, this temperature is above room temperature with a range of from about 50° C. to about 500° C. Higher temperatures within this range usually result in quicker and more complete conversion to a ceramic. The coatings are usually subjected to these temperatures for a time sufficient to ceramify the coating, generally up to about 4 hours, such as from a range of between about 1 minute and about 2 hours, such as from 5 minutes to 1 hour.

The above heating may be conducted at any effective atmospheric pressure from vacuum to superatmospheric and under any effective gaseous environment such as an inert gas ($N_2$, etc.) or any oxygen-containing environment.

It is also contemplated by the above description that the resin coating may be simultaneously exposed to the catalyst and water environment (liquid or gaseous) and subjected to a temperature sufficient to convert it to the ceramic first layer 120. The time and temperature for said exposure as well as that necessary for said ceramification are generally the same as those described above.

Any method of heating such as the use of a convection oven or radiant or microwave energy is generally functional herein. The rate of heating, moreover, is also not critical, but it is most practical and desirable to heat as rapidly as possible.

In a typical procedure, the substrate is coated with the silicon-based resin and porogen in a manner which insure that at least 5 volume % of the porogen remains in the coating, the coated substrate is then exposed to the catalyst and water, the porogen is evaporated and the coated substrate is placed in a convection oven. The oven environment is filled with an appropriate gas, including but not limited to oxygen or nitrogen or combinations thereof. The temperature in the oven is then raised to the desired level (such as about 450° C.) and maintained for the desired time (such as about 5 minutes to 2 hours).

By the above methods a thin ceramic coating, or first layer 120, is produced on the substrate 110. The first layer 120 smoothes the irregular surfaces of various substrates 110 and has excellent adhesion to the substrate 110. As noted above, the thickness of the first layer 120 may vary from 50 nm to 1000 nm, such as from 75 to 500 nm and has a refractive index ranging from greater than 1 to less than 1.41.

In addition, the porous nature of the first layer 120, formed by the removal of the porogens, functions to alter the reflective properties of the coating layer. As noted above, the pore size of the first layer 120, in certain embodiments, is greater than 0 to less than 300 nm.

In certain exemplary embodiments, there is provided a method of making the first layer 120, the method comprising: forming a silsesquioxane component by mixing the silsesquioxane component with porogen, solvent and/or catalyst, disposing the mixture on the substrate 110 by spin coating, spray coating or the like to form a first layer 120 on and in direct contact with the substrate 110; oxidatively curing and optionally heat treating the first layer 120; optionally repeating applying the first layer and oxidatively curing and optionally heat treating to form an additional first layer 120; disposing or otherwise applying an outer layer 140 comprising a polyfluoropolyether silane and/or perfluoroalkylsilane/reactive silicon-containing material mixture by spray coating, PVD coating or like, the first layer 120 making up at least part of the antireflection (AR) layer 130.

The silsesquioxane(s) used in making the first layer 120 are advantageous in that they may permit higher adhesion with glass substrates 110 and the resulting scratch resistance of the final layer 130 to be greater or increased. These silsesquioxane(s) may allow the materials of the outermost layer 140 to react in order to increase desirable wetting and slippery properties (i.e., easy to clean properties), which is advantageous.

In certain embodiments, the antireflective layer 130 also includes an outermost layer 140 that is disposed on and in direct contact with the first layer 120 such that the first layer 120 is located between the outermost layer 140 and the substrate 110. In certain embodiments, the outermost layer 140 may be covalently bonded or reacted with the first layer 120, and hence the first layer 120 and outermost layer 140 are integral (i.e., form one integral layer). Alternatively, the outermost layer 140 may be free of covalent bonds with the first layer 120. Said differently, the outermost layer 140 may not be reacted with the first layer 120. The terminology "may not be reacted with the first layer 120" describes that the outermost layer 140 is not covalently or ionically reacted with, or bound to, the first layer 120. In these instances, the outermost layer 140 may or may not be hydrogen bonded or otherwise electrostatically attracted to the first layer 120 without being covalently bonded to the first layer 120. In one embodiment, the outermost layer 140 extends uniformly across the entirety of the first layer 120 (e.g. from and between all edges). Alternatively, the outermost layer 140 may extend across some portions of the first layer 120 and not others, e.g. in a heterogeneous manner or broken pattern.

The outermost layer 140 may be alternatively described as a superstrate. The outermost layer 140, when functioning as a superstrate, may provide protection to an outermost front surface of the optical element 100. Similarly, the outermost layer 140 may provide protection to an outermost back surface of the optical element 100, depending on orientation of the optical element 100. The outermost layer 140 may be soft and flexible or may be rigid and stiff. Alternatively, the outermost layer 140 may include rigid and stiff segments while simultaneously including soft and flexible segments. The outermost layer 140 may be load bearing or non load bearing and may be included in any portion of the optical element 100. The outermost layer 140 may be used to protect the optical element 100 from environmental conditions such as rain, snow, and heat.

The outermost layer 140 is not particularly limited in composition so long as it provides the outer surface 150 of the antireflective coating 130 with the surface energy and water contact angles as described further below. In various embodiments, the outermost layer 140 is, includes, consists essentially of, or consists of, a fluorine-containing compound such as a polyfluoropolyether silane, an organic polymer, a silicon-containing material, or combinations thereof. In certain embodiments, the polyfluoropolyether silane is a perfluoropolyether silane. In various embodiments, the terminology "consists essentially of" describes that the outermost layer 140 only includes polymers having a surface energy in the ranges provided below. In additional embodiments, any value, or range of values, both whole and fractional, within or between the upper and lower range values described above are contemplated.

The outermost layer 140 is not particularly limited in dimensions. For example, the outermost layer 140 may have a thickness of as little as one molecule thick (e.g. on the order of 5 nanometers) up to 1 micrometer thick, e.g. 0.05 to 500 nm, such as 1 to 250 nm, such as 1 to 100 nm. In additional embodiments, any value, or range of values, both whole and fractional, within or between any one or more values described above are contemplated.

In addition, in certain embodiments, the outermost layer 140 extends uniformly across an entirely of the first layer 120 (e.g. from and between all edges). Alternatively, the outermost layer 140 may extend across some portions of the first layer 120 and not others, e.g. in a heterogeneous manner or broken pattern.

In still other embodiments, the outermost layer 140 may be further defined as a surface treatment that is disposed on and in direct contact with the first layer 120 and reacted with (e.g. covalently bonded to) the first layer 120.

The outermost surface 150 of the antireflective layer 130, such as the outermost surface 150 of the outermost layer 140 as illustrated in FIG. 1, has a surface energy of less than 40 mN/m measured at 20° C. In various embodiments, the outermost surface 150 has a surface energy of less than 35, 30, 25, 24, 23, 22, 21, 20, or 19, milliNewtons per meter (mN/m) measured at 20° C. In additional embodiments, any value, or range of values, both whole and fractional, within or between any one or more values described above are contemplated. Typically, surface energy of the outermost surface 150 is measured according to ASTM D7490.

Alternatively, the outermost surface 150 of the antireflective layer 130, such as the outermost surface 150 of the outermost layer 140 as illustrated in FIG. 1, may also be defined in terms of water contact angle. In certain embodiments, the outermost surface 150 has a water contact angle of greater than or equal to 70° and less than or equal to 120°, such as greater than or equal to 100° and less than or equal to 120°, as determined using a modified version of ASTM 5946-04 in which 2 µl drops of fluid are used in place of the 5 µl drops of fluid as provided in the standard (but otherwise in accordance with the method). As referred to hereinafter and in the claims that follow, ASTM 5946-04 refers to the method as modified.

In certain embodiments, the outermost surface 150 has a water contact angle of greater than or equal to 70° to less than or equal to 120° after 100 cycles of abrasion as described in the examples below, with the water contact angle again being determined using ASTM 5946-04. In certain embodiments, the outermost surface 150 has both the surface energy and water contact angle properties as described previously, both before and after cloth abrasion.

In other embodiments, the outermost layer 140 is formed from a polyfluoropolyether silane having the following general formula (A):

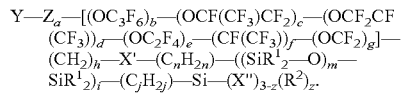

While the polyfluoropolyether silane is not limited to that of general formula (A), specific aspects of general formula (A) are described in greater detail below. The groups indicated by subscripts b-g, i.e., the groups within the square brackets in formula (A), may be present in any order within the polyfluoropolyether silane, including a different order as that which is represented in general formula (A) above and throughout this disclosure. Moreover, these groups may be present in randomized or block form. In addition, the group represented by subscript b is typically linear, i.e., the group represented by subscript b may alternatively be written as $(O-CF_2-CF_2-CF_2)_b$. In the description below, $C_{p'}-C_{q'}$ (with p' and q' each being integers) regarding a hydrocarbon or alkyl group means such group has from p' to q' carbon atoms. When the group indicated by subscript i is present, the polyfluoropolyether silane comprises a siloxane segment. Even in these embodiments, the polyfluoropolyether silane is generally referred to as a silane in view of the terminal silicon atom that is not present in any siloxane segment.

In general formula (A) above, Z is independently selected from $-(CF_2)-$, $-(CF(CF_3)CF_2O)-$, $-(CF_2CF(CF_3)O)-$, $-(CF(CF_3)O)-$, $-(CF(CF_3)-CF_2)-$, $-(CF_2-CF(CF_3))-$, and $-(CF(CF_3))-$. Z is typically selected such that the polyfluoropolyether silane does not include an oxygen-oxygen (O—O) bond within the backbone. In addition, in this general formula, a is an integer from 1 to 200; b, c, d, e, f, and g are integers each independently selected from 0 or from 1 to 200; h, n and j are integers each independently selected from 0 or from 1 to 20; i and m are integers each independently selected from 0 or from 1 to 5; X' is a divalent organic group or an oxygen atom; $R^1$ is an independently selected $C_1$-$C_{22}$ hydrocarbyl group; z is an integer independently selected from 0 to 2; X" is an independently selected hydrolysable group; $R^2$ is an independently selected $C_2$-$C_{22}$ hydrocarbyl group which is free of aliphatic unsaturation; and Y is selected from H, F, and $(R^2)_z(X")_{3-z}Si-(C_jH_{2j})-((SiR^1_2-O)_m-SiR^1_2)_i-(C_nH_{2n})-X'-(CH_2)_h-$; wherein X", X', z, $R^1$, $R^2$, j, m, i, n, and h are as defined above.

$R^1$, which is an independently selected $C_1$-$C_{22}$ hydrocarbyl group, may be linear, branched, or cyclic. In addition, $R^1$ may include heteroatoms within the hydrocarbyl group, such as oxygen, nitrogen, sulfur, etc., and may be substituted or unsubstituted. Typically, $R^1$ is $C_1$-$C_4$ alkyl group. In addition, the groups indicated by subscripts n and j, i.e., groups $(C_nH_{2n})$ and $(C_jH_{2j})$, may also be independently linear or branched. For example, when n is 3, these groups may independently have the structure $-CH_2-CH_2-CH_2-$, $-CH(CH_3)-CH_2-$, or $-CH_2-CH(CH_3)-$, wherein the latter two structures have pendent alkyl groups, i.e., these structures are branched and not linear.

With respect to the moieties represented by subscripts m, i, and j: when subscript i is 0, subscript j is also 0; when subscript i is an integer greater than 0, subscript j is also an integer greater than 0; and when subscript i is an integer greater than 0, m is also an integer greater than 0. Said differently, when the group represented by subscript i is present, the group represented by subscript j is also present. The inverse is also true, i.e., when the group represented by subscript i is not present, the group represented by subscript j is also not present. In addition, when i is an integer greater than 0, the group represented by subscript m is present, and m is also an integer greater than 0. In certain embodiments, subscripts m and i are each 1. Typically, the subscript i does not exceed 1, although the subscript m may be an integer greater than 1 such that siloxane bonds (i.e., Si—O bonds) are present within the group represented by subscript i.

In certain exemplary embodiments, there is provided a method of making the antireflective layer 130 using a bi-layer process including: forming a silsesquioxane component by mixing the silsesquioxane component with porogen, solvent and/or catalyst, disposing or otherwise applying the mixture by spin coating, spray coating or the like to form a first layer 120 on and in direct contact with the substrate 110; oxidatively curing and optionally heat treating the first layer 120; optionally repeating applying the first layer and oxidatively curing and optionally heat treating to form an additional first layer 120; disposing or otherwise applying an outermost layer 140 on and in direct contact with the first layer 120 comprising a polyfluoropolyether silane (such as described above) and/or polyflouroalkyl silane/reactive silicon-containing material by spray coating, PVD coating or like such that the first layer 120 is between the substrate 110 and the outermost layer 140. In certain embodiments, the polyflouroalkyl silane is a perflouroalkyl silane.

In certain exemplary embodiments, there is a method of making the antireflective layer 130 for deposition on a substrate 110 including: forming a silsesquioxane component by mixing the silsesquioxane component with porogen, solvent and/or catalyst, disposing or otherwise applying the mixture by spin coating, spray coating or the like to form a first layer 120 on a substrate 110; oxidatively curing and optionally heat treating the first layer 120; optionally repeating applying the first layer and oxidatively curing and optionally heat treating to form an additional first layer 120; disposing an outermost layer 140 on and in direct contact with the first layer 120 comprising a polyfluoropolyether silane and/or polyflouroalkyl silane/reactive silicon-containing material by spray coating, PVD coating or like such that the first layer 120 is between the substrate 110 and the outermost layer 140. In certain embodiments, the outermost surface 150 of the durable antireflective layer 130 has one of an oil contact angle and a water contact angle after 2000 cycle steel wool abrasion test that varies by less than about 20% (e.g., from 1% to <20%) from an initial contact angle measured before wiping.

In certain exemplary embodiments, the optical element 100 includes a touch screen glass substrate 110 on a light incident side; an anti-reflection layer 130 provided on the glass substrate 100; wherein the anti-reflection layer 130 comprises at least a first layer 120 provided directly on and contacting the glass substrate 110 and an outermost layer 140 on the first layer 120, wherein the first layer 120 comprises at least one silsesquioxane and the outer layer 140 comprises a perfluorosilane or perfluorosilane/siloxane polymeric mixture. Optionally, the glass substrate 110 in these embodiments comprises a soda-lime-silica glass, any generation of Gorilla Glass® (Corning, Inc.), Dragontail® glass (Asahi), Xensation® (Schott), sapphire, silicon, silicon carbide, or other organic or inorganic transparent materials. Optionally, the first layer 120 provided directly on and contacting the glass substrate 110 comprises hydrogen silsesquioxane and the outermost layer 140 comprising a polyfluoropolyether silane and/or polyflouroalkyl silane/reactive silicon-containing material. In certain embodiments, the outermost surface 150 of the durable antireflective layer 130 has one of an oil contact angle and a water contact angle after 2000 cycle steel wool abrasion test that varies by less than about 20% (e.g., from 1% to <20%) from an initial contact angle measured before wiping.

In another exemplary embodiment, as opposed to forming the first layer 120 in which the porogen is mixed with the polyorganohydrogensiloxane resins containing at least two silicon-bonded hydrogen groups per molecule and applied to the substrate 110 and remains in the applied coating as a separate component until it is subsequently removed in a post application step as the first layer 120 is hydrolyzed and condensed, the porogen component may be included into the polymer chain that forms the silicone resin first layer 120 and can then be removed post-application via a thermolysis-type reaction mechanism as described below. In this method, the porogen component is cleaved or otherwise dissociated from the polymer chain forming the silicone resin and removed to provide the first layer 120 with porosity aids in providing the antireflective properties described above.

In one exemplary thermolysis-type reaction mechanism, as described in general in U.S. Pat. No. 6,197,913, the first layer 120 is formed by (A) contacting a hydridosilicon-based resin with an alkenyltriarylsilane in the presence of a platinum group metal-containing hydrosilylation catalyst effecting formation of a silicon resin where at least 5 percent of silicon atoms are substituted with at least one triarylsilylalkylene group and at least 45 percent of silicon atoms are substituted with at least one hydrogen atom and (B) heating the silicon resin of step (A) in an atmosphere at a temperature sufficient to effect thermolysis of the triarylsilylalkylene groups from the silicon atoms. The removal of the triarylsilylalkylene groups from the first layer 120 creates porosity in the coating layer to provide the antireflective properties. The outer layer 140 may then be introduced onto the first layer 120 in the method as described in the previous embodiment above.

As set forth above, other exemplary embodiments further provide a surface-treated article and methods of preparing surface-treated articles, formed from the optical elements 100 or comprising the optical elements 100 which are described collectively in greater detail below.

Non-limiting examples of electronic articles or optical devices formed from the optical elements 100 or comprising the optical elements 100 include those having electronic displays, such as LCD displays, LED displays, OLED displays, plasma displays, etc. These electronic displays are often utilized in various electronic devices, such as computer monitors, televisions, smart phones, GPS units, music players, remote controls, hand-held video games, portable readers, etc. Exemplary electronic articles include those having interactive touch-screen displays or other components which are often in contact with the skin and which oftentimes display stains and/or smudges.

In addition, the article formed from the optical elements 100 or comprising the optical elements 100 may also be a metal article, such as but not limited to consumer appliances and components. Non-limiting exemplary metal articles formed from the optical elements 100 or comprising the optical elements 100 are a dishwasher, a stove, a microwave, a refrigerator, a freezer, etc, typically having a somewhat glossy metal appearance, such as stainless steel, brushed nickel, etc.

Examples of suitable optical articles formed from the optical elements 100 or comprising the optical elements 100, but are not limited to, inorganic materials, such as glass plates, glass plates comprising an inorganic layer, ceramics, and the like.

Additional examples of suitable optical articles formed from the optical elements 100 or comprising the optical elements 100, include, but are not limited to, organic materials, such as transparent plastic materials and transparent plastic materials comprising an inorganic layer, etc. Specific examples these optical articles include antireflective films, optical filters, optical lenses, eyeglass lenses, beam splitters, prisms, mirrors, etc. Among organic materials, examples of transparent plastic materials include materials comprising various organic polymers. From the view point of transparency, refractive index, dispersibility and like optical properties, and various other properties such as shock resistance, heat resistance and durability, materials used as optical elements 100 usually comprise polyolefins (polyethylene, polypropylene, etc.), polycarbonates, polyesters (polyethylene terephthalate, polyethylene naphthalate, etc.), polyamides (nylon 6, nylon 66, etc.), polystyrene, polyvinyl chloride, polyimides, polyvinyl alcohol, ethylene vinyl alcohol, acrylics, celluloses (triacetylcellulose, diacetylcellulose, cellophane, etc.), or copolymers of such organic polymers. These materials may be utilized in ophthalmic elements. Non-limiting examples of ophthalmic elements include corrective and non-corrective lenses, including single vision or multi-vision lenses like bifocal, trifocal and progressive lenses, which may be either segmented or non-segmented, as well as other elements used to correct, protect, or enhance vision, including without limitation contact lenses, intra-ocular lenses, magnifying lenses and protective lenses or visors. Exemplary material for ophthalmic elements formed from the optical elements 100 or comprising the optical elements 100, comprises one or more polymers selected from polycarbonates, polyamides, polyimides, polysulfones, polyethylene terephthalate and polycarbonate copolymers, polyolefins, especially polynorbornenes, diethylene glycol-bis(allyl carbonate) polymers—known as CR39—and copolymers, (meth)acrylic polymers and copolymers, especially (meth)acrylic polymers and copolymers derived from bisphenol A, thio(meth)acrylic polymers and copolymers, urethane and thiourethane polymers and copolymers, epoxy polymers and copolymers, and episulfide polymers and copolymers.

Some embodiments include any one or more of the following numbered aspects.

Aspect 1. An optical element comprising: a substrate; and an antireflective layer disposed on and in direct contact with the substrate and having a refractive index ranging from greater than 1 to less than 1.41 and having a pore size ranging from greater than 0 to less than 300 nanometers (nm), wherein an outermost surface of the antireflective layer has a water contact angle ranging from greater than or equal to 70 degrees (°) to less than or equal to 120° as determined using ASTM 5946-04.

Aspect 2. The optical element according to aspect 1, wherein the antireflective layer comprises: a first layer disposed on and in direct contact with the substrate and having a refractive index ranging from greater than 1 to less than 1.41 and having a pore size ranging from greater than 0 to less than 300 nm, the first layer comprising an oxidatively-cured product of a silicon-based resin; and an outermost layer disposed on and in direct contact with the first layer such that the first layer is between the substrate and the outermost layer.

Aspect 3. The optical element according to aspect 1 or aspect 2, wherein light transmittance in the visible spectrum through the antireflective layer is from greater than 85 percent (%) to 100%.

Aspect 4. The optical element to any one of aspects 1 to 3, wherein the haze value through the antireflective layer is from 0 percent (%) to less than 15%.

Aspect 5. The optical element according to any one of aspects 2 to 4, wherein the thickness of the first layer ranges from 50 nm to 1000 nm.

Aspect 6. The optical element according to any one of aspects 2 to 5, wherein the thickness of the first layer ranges from 75 nm to 500 nm.

Aspect 7. The optical element according to any one of aspects 2 to 6, wherein the silicon-based resin has a number average molecular weight from 600 to 150,000 grams per mole (g/mol) and has at least two silicon-bonded hydrogen groups per molecule.

Aspect 8. The optical element according to any one of aspects 2 to 7, wherein the silicon-based resin is a silsesquioxane resin, a polysilsesquioxane resin, a silazane resin or a polysilazane resin.

Aspect 9. The optical element according to any one of aspects 2 to 8, wherein the silicon-based resin is a silsesquioxane resin having the formula: $(R_3SiO_{1/2})_a(R_2SiO_{2/2})_b(RSiO_{3/2})_c(SiO_{4/2})_d$ wherein each R is independently selected from the group consisting of hydrogen, alkyl, alkenyl, aryl groups and alkyl, alkenyl, and aryl groups substituted with halogen, nitrogen, oxygen, sulfur or silicone atoms, with the proviso that on average at least 2 R groups are hydrogen; wherein a, b, c and d are mole fractions, wherein a+b+c+d is 1, and wherein c+d is greater than zero.

Aspect 10. The optical element according to any preceding aspect wherein the outermost surface of the antireflective layer has a water contact angle ranging from greater than or equal to 70° to less than or equal to 120° as determined using ASTM 5946-04.

Aspect 11. The optical element according to any one preceding aspect wherein the outermost surface of the antireflective layer has water contact angle ranging from greater than or equal to 70° to less than or equal to 120° as determined using ASTM 5946-04 after 100 cycles of cloth abrasion.

Aspect 12. The optical element according to any one preceding aspect, wherein the outermost surface of the antireflective layer has surface energy of less than 40 milliNewtons per meter (mN/m) measured at 20° C.

Aspect 13. The optical element according to any one preceding aspect, wherein the outermost surface of the antireflective layer has surface energy of less than 30 milliNewtons per meter (mN/m) measured at 20° C.

Aspect 14. The optical element according to any one preceding aspect, wherein the outermost surface of the antireflective layer has surface energy of less than 25 milliNewtons per meter (mN/m) measured at 20° C.

Aspect 15. The optical element according any one of aspects 2 to 14 wherein the outermost layer comprises a fluorine-containing compound.

Aspect 16. The optical element according to aspect 15, wherein the outermost layer comprises a polyfluoropolyether silane according to the general formula (A): $Y-Z_a-[(OC_3F_6)_b-(OCF(CF_3)CF_2)_c-(OCF_2CF(CF_3))_d-(OC_2F_4)_e-(CF(CF_3))_f-(OCF_2)_g]-(CH_2)_h-X'-(C_nH_{2n})-((SiR^1_2-O)_m-SiR^1_2)_i-$
$(C_jH_{2j})-Si-(X'')_{3-z}(R^2)_z$; wherein Z is independently selected from $-(CF_2)-$, $-(CF(CF_3)CF_2O)-$, $-(CF_2CF(CF_3)O)-$, $-(CF(CF_3)O)-$, $-(CF(CF_3)CF_2)-$, $-(CF_2CF(CF_3))-$, and $-(CF(CF_3))-$; a is an integer from 1 to 200; b, c, d, e, f, and g are integers each independently selected from 0 to 200; h, n and j are integers each independently selected from 0 to 20; i and m are integers each independently selected from 0 to 5; X' is a bivalent organic group or O; $R^1$ is an independently selected $C_1$-$C_{22}$ hydrocarbyl group; z is an integer independently selected from 0 to 2; X'' is an independently selected hydrolysable group; $R^2$ is an independently selected $C_1$-$C_{22}$ hydrocarbyl group which is free of aliphatic unsaturation; and Y is selected from H, F, and $(R^2)_z(X'')_{3-z}Si-(C_jH_{2j})-((SiR^1_2-O)_m-SiR^1_2)_i-(C_nH_{2n})-X'-(CH_2)_h-$; wherein X'', X', z, $R^1$, $R^2$, j, m, i, n and h are as defined above; provided that when subscript i is 0, subscript j is also 0; when subscript i is an integer selected from 1 to 5, subscript j is an integer selected from 1 to 20 and m is an integer selected from 1 to 5. The polyfluoropolyether silane of formula (A) is an example of the fluorine-containing compound.

Aspect 17. The optical element according any one of aspects 2 to 15 wherein the outermost layer comprises a silicon-containing material.

Aspect 18. The optical element according to any one of aspects 2 to 17 wherein the outermost layer is covalently bonded to the first layer.

Aspect 19. A photovoltaic device having an optical element according to any one preceding aspect.

Aspect 20. A window having an optical element according to any one of aspects 1 to 18.

Aspect 21. A touch screen panel having an optical element according to any one of aspects 1 to 18.

Aspect 22. A method for forming an optical element comprising a substrate and an antireflective layer disposed on and in direct contact with the substrate and having a refractive index ranging from greater than 1 to less than 1.41 and having a pore size ranging from greater than 0 to less than 300 nanometers (nm), wherein an outermost surface of the antireflective layer has a water contact angle ranging from greater than or equal to 70 degrees) (°) to less than or equal to 120° as determined using ASTM 5946-04, the method for forming the optical element comprising: (I) applying a silicon-based resin on the substrate; (II) oxidatively curing the silicon-based resin on the substrate to form a first layer disposed on and in direct contact with the substrate, the first layer having a pore size ranging from greater than 0 to less than 300 nm; and (III) disposing an outermost layer on and in direct contact with the first layer such that the first layer is between the substrate and the outermost layer.

Aspect 23. The method according to aspect 22, wherein step (II) comprises oxidatively curing and heat treating the silicon-based resin on the substrate to form a first layer disposed on and in direct contact with the substrate, the first layer having a pore size ranging from greater than 0 to less than 300 nm.

Aspect 24. The method of any one of aspects 22 or 23 further comprising repeating steps (I) and (II) prior to step (III) to form an additional first layer.

Aspect 25. The method according to any one of aspects 22 to 24, wherein the silicon-based resin further comprises porogen and wherein the porogen is removed from the silicon-based resin prior to Step (III).

Aspect 26. The method according to aspect 25, wherein the porogen is a solvent, a polymer, or an oligomer, or alternatively a polymer or oligomers that is chemically bound to the silicon-based resin.

Aspect 27. The method according to any one of aspects 22 to 26 further comprising covalently bonding the outermost layer with the first layer.

Aspect 28. The method according to any one of aspects 22 to 27, wherein the silicon-based resin is a silsesquioxane resin having the formula: $(R_3SiO_{1/2})_a(R_2SiO_{2/2})_b(RSiO_{3/2})_c(SiO_{4/2})_d$ wherein each R is independently selected from the group consisting of hydrogen, alkyl, alkenyl, aryl groups and alkyl, alkenyl, and aryl groups substituted with halogen, nitrogen, oxygen, sulfur or silicone atoms, with the proviso that on average at least 2 R groups are hydrogen; wherein a, b, c and d are mole fractions, wherein a+b+c+d is 1, and wherein c+d is greater than zero.

Aspect 29. The method according to any one of aspects 22 to 28, wherein the outermost layer comprises a polyfluoropolyether silane according to the general formula (A):
$Y-Z_a-[(OC_3F_6)_b-(OCF(CF_3)CF_2)_c-(OCF_2CF(CF_3))_d-(OC_2F_4)_e-(CF(CF_3))_f-(OCF_2)_g]-(CH_2)_h-X'-(C_nH_{2n})-((SiR^1_2-O)_m-SiR^1_2)_i-(C_jH_{2j})-Si-(X'')_{3-z}(R^2)_z$; wherein Z is independently selected from $-(CF_2)-$, $-(CF(CF_3)CF_2O)-$, $-(CF_2CF(CF_3)O)-$, $-(CF(CF_3)O)-$, $-(CF(CF_3)CF_2)-$, $-(CF_2CF(CF_3))-$, and $-(CF(CF_3))-$; a is an integer from 1 to 200; b, c, d, e, f, and g are integers each independently selected from 0 to 200; h, n and j are integers each independently selected from 0 to 20; i and m are integers each independently selected from 0 to 5; X' is a bivalent organic group or 0; $R^1$ is an independently selected $C_1$-$C_{22}$ hydrocarbyl group; z is an integer independently selected from 0 to 2; X" is an independently selected hydrolysable group; $R^2$ is an independently selected $C_1$-$C_{22}$ hydrocarbyl group which is free of aliphatic unsaturation; and Y is selected from H, F, and $(R^2)_z(X'')_{3-z}Si-(C_jH_{2j})-((SiR^1_2-O)_m-SiR^1_2)_i-(C_nH_{2n})-X'-(CH_2)_h-$; wherein X", X', z, $R^1$, $R^2$, j, m, i, n and h are as defined above; provided that when subscript i is 0, subscript j is also 0; when subscript i is an integer selected from 1 to 5, subscript j is an integer selected from 1 to 20 and m is an integer selected from 1 to 5.

The appended claims are not limited to express and particular compounds, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims. All U.S. patent application publications and patents referenced in the Detailed Description herein, or a portion thereof if only the portion is referenced, are hereby incorporated herein by reference to the extent that incorporated subject matter does not conflict with the present description, which would control in any such conflict.

Further, any ranges and subranges relied upon in describing various embodiments independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate some of the embodiments and are not to be viewed in any way as limiting to the scope of the invention.

EXAMPLES

Materials: Tetradecane (≥99%), N,N-diethylhydroxylamine (≥98%), and Methyl isobutyl ketone were purchased from Aldrich. 28-30 wt % ammonia was purchased from Fluka. The hydrogen silsesquioxane was prepared in accordance with the method of U.S. Pat. No. 3,615,272. Glass microscope slides (75 mm×50 mm×1.0 mm) were purchased from Fisher scientific. 4" silica wafers (with thickness of 380-750 μm) are purchased from Pure Wafer, Inc. Various articles representative of this disclosure were formed and evaluated as described below.

Measuring Water Contact Angle (WCA): The measurement of static water contact angles pursuant to ASTM 5946-04 as modified herein was made using 2 μL deionized water using a VCA Optima XE goniometer produced by AST Products, Inc., Billerica, Mass. Reported data was the average WCA of six measurements at multiple places on the coatings using multiple samples. WCA was measured after the abrasion cycles. Generally, after abrasion, the greater the WCA, the greater the durability of the coating.

Measuring Hexadecane Contact Angle (HCA): The measurement of static hexadecane contact angles, in a manner similar to the measurement of water contact angle pursuant to ASTM 5946-04 as modified herein, was made using 2 μL hexadecane and a VCA Optima XE goniometer. Reported data was the average HCA of four measurements at multiple places on the coatings.

Abrasion Testing: The abrasion resistance test utilized a reciprocating abrader Model 5900 produced by Taber Industries of North Tonawanda, N.Y. The test was carried out with Kimberly-Clark Wypall band Microfiber cloths (83630) over a surface area of 20 mm×20 mm. The reciprocating abrader was operated for 100, 500, 1000, 2000 cycles at a speed of 40 cycles per minute with a stroke length of 1 inch and a load of 5 Newtons (N). One backward and forward movement is termed a cycle.

Some abrasion tests were also carried out with 0000# steel wool over a surface area of 10 mm×10 mm. The reciprocating abrader was operated for 1000 cycles at a speed of 40 cycles per minute with a stroke length of 1 inch and a load of 10 N. One backward and forward movement is termed a cycle.

Haze Measurement: Sample appearance was measured using a BYK Haze-Gard Plus transparency meter. The average of three measurements was recorded for transparency, haze, and clarity.

Cleaning and Activation of Glass Slides As Substrates: The glass slides were cleaned with detergent in ultrasonic bath for 5 min, and then rinsed with deionized water three times for 2 min each in an ultrasonic bath (Fisher Scientific FS-220). After cleaning, the glass slides were dried in a 125° C. oven for 1 hour. 4" silicon wafers were also used as substrates. Before applying coatings, the glass slides and silicon wafers were plasma treated with Argon (300 W, 60 seconds) using a March Plasma PX250 chamber. The activated substrates were used immediately.

Film Characterizations: The refractive index and thickness of HSQ thin films (Porous HSQ Films) were measured using XLS-100 spectroscopic ellipsometer manufactured by J. A. Woollam Co., Inc. The transmittance and reflectance of thin films were measured using 5000 UV-Vis-NIR Spectrophotometer manufactured by Varian Cary.

Calculation of Surface Energy: Surface energy values were calculated based on the contact angle results using the Zisman method or the Ovens-Wendt method.

Example 1

Porous HSQ Film. A hydrogen silsesquioxane solution containing a porogen was prepared by adding 5.42 g of tetradecane (Sigma-Aldrich) to 30.82 g of a 26 weight percent solution of hydrogen silsesquioxane (HSQ) in methyl isobutyl ketone (Sigma-Aldrich). The solution was spin-coated onto a glass substrate at a speed of 3000 rpm for 20 seconds. The coating was then exposed to vapors from a solution of 28.0-30.0 wt % ammonium hydroxide solution (Sigma-Aldrich) for one hour. This was accomplished by placing the coated substrates into a sample holder and then placing the sample holder into an enclosed container containing a maximum of 50 g of the ammonium hydroxide solution so that the substrates do not contact the solution. The coating was then baked at 350° C. for one hour on a hot plate. The transmittance of the combined coating and glass substrate was 95.07%, compared to a transmittance of 92.39% for the glass substrate with no coating. The haze of the coating (Porous HSQ Film) on the glass substrate was 0.42% compared to 0.17% for the glass substrate with no coating.

Example 2

Porous HSQ Film. A solution of hydrogen silsesquioxane (HSQ) and porogen as prepared in Example 1 was spin-coated onto a polished silicon wafer substrate at a speed of 3000 rpm for 20 seconds. The coating was then exposed to vapors from a 28.0-30.0 wt % ammonium hydroxide solution (Sigma-Aldrich) for one hour in the manner described in Example 1. The coating was then baked at 350° C. for one hour on a hot plate. The refractive index of the cured hydrogen silsesquioxane coating (Porous HSQ Film) was 1.38.

Example 3

Porous HSQ Film. A solution of hydrogen silsesquioxane and porogen was prepared by mixing 2.6 g of hydrogen silsesquioxane, 3 g tetradecane (Sigma-Aldrich) and 7.4 g methyl isobutyl ketone (Sigma-Aldrich) for 1 hour. The solution was spin-coated onto a polished silicon wafer at a speed of 3000 rpm for 20 seconds. The coating was then exposed to vapors from a 28.0-30.0 wt % ammonium hydroxide solution (Sigma-Aldrich) for 60 minutes in the manner described in Example 1. The coating was then baked in a furnace with under a nitrogen atmosphere at 450° C. for one hour. The refractive index of the cured coating (Porous HSQ Film) was 1.152.

Example 4

Porous HSQ Film. A solution of hydrogen silsesquioxane and porogen was prepared by mixing 2.6 g of hydrogen silsesquioxane, 2.5 g tetradecane (Sigma-Aldrich) and 7.4 g methyl isobutyl ketone (Sigma-Aldrich) for 1 hour. The solution was spin-coated onto a polished silicon wafer at a rate of 3000 rpm for 20 seconds. The coated wafer was then exposed to vapors from a 28.0-30.0 wt % ammonium hydroxide solution (Sigma-Aldrich) for 60 minutes in the manner described in Example 1 before baking in a furnace with an oxygen containing atmosphere at 350° C. for one hour. The refractive index of the cured coating (Porous HSQ Film) was 1.378 with a surface water contact angle of 80°.

Example 5

Porous HSQ Film+PFPE Silane Coating. A polyfluoropolyether silane (PFPE Silane) was prepared substantially in accordance with Synthesis Example 1 of U.S. Pat. No. 8,211,248. Next, the polyfluoropolyether silane was diluted in 3M Novec HFE-7200 fluorinated solvent to form a dilute solution having 0.2 wt % polyfluoropolyether silane. The dilute solution was applied onto the cured porous HSQ film surface prepared in Example 3 by spray coating to form a PFPE silane coating layer. The coated HSQ film was placed into an oven set at 125° C., and containing a water pan, for 1 hour. The resultant coated layer (Porous HSQ Film and PFPE Coating) showed a water contact angle of 118°.

Example 6

Porous HSQ Film+PFPE Silane Coating. The dilute solution having 0.2 wt % polyfluoropolyether silane prepared in Example 5 was applied onto the cured porous HSQ surface prepared in Example 4 by spray coating to form a PFPE silane coating layer. The coated HSQ film was placed into an oven set at 125° C., and containing a water pan, for 1 hour. The resultant coated layer (Porous HSQ film and PFPE) coating showed a water contact angle (WCA) of 114°, increasing slightly to 115° after 2000 cycles of cloth abrasion (1 cm×1 cm with a 5 N force).

Example 7

Porous HSQ Film+PFPE Silane Coating. A solution of hydrogen silsesquioxane and porogen was prepared by mixing 1.11 g of hydrogen silsesquioxane (HSQ) with 0.0998 g of tetradecane (Sigma-Aldrich) and 10 g of octamethyltrisiloxane (commercially available from Dow Corning Corporation of Midland, Mich.) for one hour. Transparent coatings were prepared by spin coating this solution onto a glass substrate with a reflectivity of about 8% at a speed of 2600 rpm for 30 seconds. The coating was then exposed to vapors from a 28.0-30.0 wt % ammonium hydroxide solution (Sigma-Aldrich) for 60 minutes in the manner described in Example 1. The coating was then baked under an atmosphere air at a temperature of 360° C. for 30 minutes on a hotplate. A layer of the dilute PFPE silane solution prepared in Example 5 was applied onto the cured HSQ surface by spray coating. The resultant PFPE silane coated HSQ film was then baked in an oven set at 125° C. for 1 hour. The resultant coated layer (Porous HSQ Film and PFPE Coating) showed a reflectivity of 6% and a transmittance of 93%. The water contact angle (WCA) of the outermost surface of the resultant coated layer (Porous HSQ Film and PFPE Silane Coating) was measured at 116 °, decreasing to 110° after 2000 cycles of steel wool abrasion (1 cm×1 cm abrasion with a force of 10 N).

Example 8

Porous HSQ Film+PFPE Silane Coating. A solution of hydrogen silsesquioxane and porogen was prepared by mixing 1.1 g of hydrogen silsesquioxane, 0.222 g tetradecane (Sigma-Aldrich) and 10 g of octamethyltrisiloxane (commercially available from Dow Corning Corporation of Midland, Mich.) for 1 hour. Transparent coatings were prepared by spin coating this solution onto a glass substrate with a reflectivity of about 8% at a speed of 2600 rpm for 30 seconds. The coating was then exposed to vapors from a 28.0-30.0 wt % ammonium hydroxide solution (Sigma-Aldrich) for 60 minutes and then baked under an air atmosphere at a temperature of 360° C. for 30 minutes on a hotplate. A layer of the dilute polyfluoropolyether silane solution prepared in Example 5 was applied onto the cured HSQ surface by spray coating. The resultant PFPE silane coated HSQ film was then baked in an oven set at 125° C. for 1 hour. The resultant coated layer (Porous HSQ film and PFPE coating) showed a reflectivity of 6% and a transmittance of 93%. The water contact angle (WCA) of the outermost surface of the resultant coated layer (Porous HSQ film and PFPE coating) was measured at 116°, decreasing to 112° after 2000 cycles of steel wool abrasion (1 cm×1 cm abrasion with a force of 10 N). The coefficient of friction (CoF) of the resultant coated layer (Porous HSQ Film and PFPE Silane Coating) was 0.076.

Example 9

Porous HSQ Film+PFPE Silane Coating. A solution of hydrogen silsesquioxane and porogen was prepared by mixing 1.1 g of hydrogen silsesquioxane, 0.44 g of tetradecane (Sigma-Aldrich) and 10 g of octamethyltrisiloxane (commercially available from Dow Corning Corporation of Midland, Mich.) for 1 hour. Transparent coatings were prepared by spin coating this solution onto a glass substrate with a reflectivity of about 8% at a speed of 2600 rpm for 30 seconds. The coating was then exposed to vapors from a 28.0-30.0 wt % ammonium hydroxide solution (Sigma-Aldrich) for 60 minutes. The coating was then baked under an air atmosphere at a temperature of 360° C. for 30 minutes on a hotplate. A layer of the dilute polyfluoropolyether silane solution prepared in Example 5 was applied onto the cured HSQ surface by spray coating. The resultant PFPE silane coated HSQ film was then baked in an oven set at 125° C. for 1 hour. The resultant coated layer (Porous HSQ Film and PFPE Silane Coating) showed a reflectivity of 5.5% and a transmittance of 93.7%. The water contact angle (WCA) of the outermost surface of the resultant coated layer (Porous HSQ Film and PFPE Silane Coating) was measured at 117°, decreasing to 99° after 2000 cycles of steel wool abrasion (1 cm×1 cm abrasion with a 10 N force).

Example 10

Porous HSQ Film+PFPE Silane Coating. A solution of hydrogen silsesquioxane and porogen was prepared by mixing 1.11 g of hydrogen silsesquioxane, 0.0998 g tetradecane (Sigma-Aldrich) and 10 g of octamethyltrisiloxane (commercially available from Dow Corning Corporation of Midland, Mich.) for 1 hour. Transparent coatings were prepared by spin coating this solution onto a glass substrate with a reflectivity of about 8% at a speed of 2600 rpm for 30 seconds. The coating was exposed to vapors from a 28.0-30.0 wt % ammonium hydroxide solution (Sigma-Aldrich) for 60 minutes. The coating was then baked under an air atmosphere at a temperature of 360° C. for 30 minutes on a hotplate. A layer of the dilute polyfluoropolyether silane solution prepared in Example 5 was applied onto the cured HSQ surface by spray coating. The resultant PFPE silane coated HSQ film was then baked in an oven set at 125° C. for 1 hour. The resultant coated layer (Porous HSQ Film and PFPE Silane Coating) showed a reflectivity of 5% and a transmittance of 95%.

Example 11

Porous HSQ Film+PFPE Silane Coating. The hydrogen silsesquioxane solution from Example 9 was spin coated onto a glass substrate with a reflectivity of about 8% at a speed of 2600 rpm for 30 seconds. The coating was then exposed to vapors from a 28.0-30.0 wt % ammonium hydroxide solution (Sigma-Aldrich) for 60 minutes. The coating was then baked under an air atmosphere at a temperature of 360° C. for 30 minutes on a hotplate. A second hydrogen silsesquioxane layer was coated on the first using the hydrogen silsesquioxane solution from Example 8 and spin coating at 2600 rpm for 30 seconds. The coating was then exposed to vapors from a 28.0-30.0 wt % ammonium hydroxide solution (Sigma-Aldrich) for 60 minutes. The coating was then baked under an air atmosphere at a temperature of 360° C. for 30 minutes on a hotplate. A layer of the dilute polyfluoropolyether silane solution prepared in Example 5 was applied onto the cured HSQ surface by spray coating. The resultant PFPE silane coated HSQ film was then baked in an oven set at 125° C. for 1 hour. The resultant coated layer (Porous HSQ Film and PFPE Silane Coating) showed a reflectivity of 5% and a transmittance is 94.7%. The water contact angle (WCA) of the outermost surface of the coating was 117°, decreasing to 99° after 2000 cycles of steel wool abrasion (1 cm x 1 cm abrasion with a 10 N force).

Example 12

Porous HSQ Film. A hydrogen silsesquioxane solution containing a porogen was prepared by adding 2 g of tetradecane (Sigma-Aldrich) to 28 g of an 8.6 weight percent solution of hydrogen silsesquioxane (HSQ) in octamethyltrisiloxane (commercially available from Dow Corning Corporation of Midland, Mich.). The solution was spin-coated onto a glass substrate at a speed of 500 rpm for 10 seconds, followed by 3000 rpm for 30 seconds. The coating was then immersed in a 2 wt % N,N-diethylhydroxylamine (Sigma-Aldrich) in water solution for one hour and then baked at 250° C. for one hour on a hot plate. The transmittance of the combined coating (Porous HSQ Film) and glass substrate was 95.13%, compared to a transmittance of 91.74% for the glass substrate with no coating. The water contact angle of the coating (Porous HSQ Film) was 25°.

Example 13

Porous HSQ Film. The solution of hydrogen silsesquioxane (HSQ) and porogen as prepared in Example 12 was spin-coated onto a polished silicon wafer substrate at a speed of a speed of 500 rpm for 10 seconds, followed by 3000 rpm for 30 seconds. The coating was then immersed in a 2 wt % N,N-diethylhydroxylamine (Sigma-Aldrich) in water solution for one hour and then baked at 250° C. for one hour on a hot plate. The refractive index of the cured hydrogen silsesquioxane coating (Porous HSQ Film) was 1.31 at 632 nm.

Example 14

Porous HSQ Film+Alkoxysilane PFPE Hybrid Polymer Coating. A layer of an alkoxysilane functional perfluoropolyether (PFPE) hybrid polymer coating (commercially available from Dow Corning Corporation of Midland, Mich.), diluted to an actives content of 0.2 weight percent in ethoxy-nonafluorobutane, was applied onto the cured porous HSQ surface prepared in Example 12 by spray coating. The coated HSQ film was placed into an oven containing a water pan and set at 125° C. for 1 hour in an oven. The transmittance of the resultant coating and glass substrate was 94.4%, compared to a transmittance of 91.74% for the glass substrate with no coating. The resultant coating (Porous HSQ Film and Alkoxysilane PFPE Hybrid Polymer) showed a water contact angle of 105° that decreased slightly to 103° after 100 cycles of cloth abrasion (1 cm×1 cm with a 5 N force).

The present disclosure has been described in an illustrative manner, and the terminology which has been used is intended to be in the nature of words of description rather than of limitation. Naturally, many modifications and variations of the instant disclosure are possible in light of the above teachings. Within the scope of the appended claims, the instant disclosure may be practiced otherwise than as specifically described.

The invention claimed is:
1. An optical element comprising:
a substrate; and
an antireflective layer comprising:
a first layer comprising an oxidatively-cured product of a silicon-based resin selected from a silsesquioxane resin having a number average molecular weight from 600 to 150,000 grams per mole (g/mol) and having the formula:

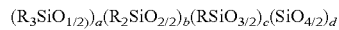

wherein each R is independently chosen from hydrogen, alkyl and alkenyl groups, and alkyl and alkenyl groups substituted with halogen, nitrogen, oxygen, and sulfur atoms, provided that on average at least two R groups are hydrogen, wherein a, b, c and d are mole fractions, wherein a+b+c+d is one and wherein c+d is greater than zero, disposed on and in direct contact with the substrate and having a refractive index ranging from greater than 1 to less than 1.41 and having a pore size ranging from greater than 0 to less than 300 nanometers (nm), wherein an outermost surface of the antireflective layer has a water contact angle ranging from greater than or equal to 70 degrees)(°) to less than or equal to 120° as determined using ASTM 5946-04; and
an outermost layer disposed on and in direct contact with the first layer such that the first layer is between the substrate and the outermost layer.

2. The optical element according to claim 1, wherein light transmittance in the visible spectrum through the antireflective layer is from greater than 85 percent (%) to 100%; or wherein the haze value through the antireflective layer is from 0% to less than 15%; or wherein light transmittance in the visible spectrum through the antireflective layer is from greater than 85% to 100% and wherein the haze value through the antireflective layer is from 0% to less than 15%.

3. The optical element according to claim 1, wherein the thickness of the first layer ranges from 50 nm to 1000 nm.

4. The optical element according to claim 1 wherein the outermost surface of the antireflective layer has a water contact angle ranging from greater than or equal to 70° to less than or equal to 120° as determined using ASTM 5946-04; or wherein the outermost surface of the antireflective layer has water contact angle ranging from greater than or equal to 70° to less than or equal to 120° as determined using ASTM 5946-04 after 100 cycles of cloth abrasion; or wherein the outermost surface of the antireflective layer has a water contact angle ranging from greater than or equal to 70° to less than or equal to 120° as determined using ASTM 5946-04 and wherein the outermost surface of the antireflective layer has water contact angle ranging from greater than or equal to 70° to less than or equal to 120° as determined using ASTM 5946-04 after 100 cycles of cloth abrasion.

5. The optical element according to claim 1, wherein the outermost surface of the antireflective layer has surface energy of less than 40 milliNewtons per meter (mN/m) measured at 20 degrees Celsius (° C.); or wherein the outermost surface of the antireflective layer has surface energy of less than 30 mN/m measured at 20° C.; or wherein the outermost surface of the antireflective layer has surface energy of less than 25 mN/m measured at 20° C.

6. The optical element according to claim 1, wherein the outermost layer comprises a polyfluoropolyether silane according to the general formula (A):

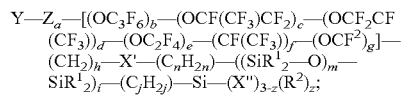

wherein Z is independently selected from —(CF$_2$)—, —(CF(CF$_3$)CF$_2$O)——(CF$_2$CF(CF$_3$)O)—, —(CF(CF$_3$)O)—, —(CF(CF$_3$)CF$_2$)—, —(CF$_2$CF(CF$_3$))—, and —(CF(CF$_3$))—; a is an integer from 1 to 200; b, c, d, e, f, and g are integers each independently selected from 0 to 200; h, n and j are integers each independently selected from 0 to 20; i and m are integers each independently selected from 0 to 5; X' is a bivalent organic group or O; R$^1$ is an independently selected C$_1$-C$_{22}$ hydrocarbyl group; z is an integer independently selected from 0 to 2; X" is an independently selected hydrolysable group; R$^2$ is an independently selected C$_1$-C$_{22}$ hydrocarbyl group which is free of aliphatic unsaturation; and Y is selected from H, F, and (R$^2$)$_z$(X")$_{3-z}$Si—(C$_j$H$_{2j}$)—((SiR$^1_2$—O)$_m$—SiR$^1_2$)$_i$—(C$_n$H$_{2n}$)—X'—(CH$_2$)$_h$—; wherein X", X', z, R$^1$, R$^2$, j, m, i, n and h are as defined above;
provided that when subscript i is 0, subscript j is also 0; when subscript i is an integer selected from 1 to 5, subscript j is an integer selected from 1 to 20 and m is an integer selected from 1 to 5.

7. The optical element according to claim 1 wherein the outermost layer comprises a silicon-containing material.

8. The optical element according to claim 1 wherein the outermost layer is covalently bonded to the first layer.

9. A photovoltaic device, window, or touch screen panel having an optical element according to claim 1.

10. A method for forming an optical element comprising a substrate and an antireflective layer disposed on and in direct contact with the substrate and having a refractive index ranging from greater than 1 to less than 1.41 and having a pore size ranging from greater than 0 to less than 300 nanometers (nm), wherein an outermost surface of the antireflective layer has a water contact angle ranging from greater than or equal to 70 degrees)(°) to less than or equal to 120° as determined using ASTM 5946-04, the method for forming the optical element comprising:

(I) applying a silicon-based resin on the substrate;
(II) oxidatively curing the silicon-based resin on the substrate to form a first layer disposed on and in direct contact with the substrate, the first layer having a pore size ranging from greater than 0 to less than 300 nm; and (III) disposing an outermost layer on and in direct contact with the first layer such that the first layer is between the substrate and the outermost layer;

wherein the silicon-based resin is selected from a silsesquioxane resin having a number average molecular weight from 600 to 150,000 grams per mole (q/mol) and having the formula:

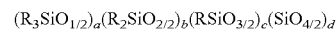

$(R_3SiO_{1/2})_a(R_2SiO_{2/2})_b(RSiO_{3/2})_c(SiO_{4/2})_d$ wherein each R is independently chosen from hydrogen, alkyl and alkenyl groups, and alkyl and alkenyl groups substituted with halogen, nitrogen oxygen, an sulfur atoms, provided that on average at least two R groups are hydrogen, wherein a, b, c and d are mole fractions, wherein a+b+c+d is one and wherein c+d is greater than zero.

11. The method according to claim 10, wherein step (ll) comprises oxidatively curing and heat treating the silicon-based resin on the substrate to form a first layer disposed on and in direct contact with the substrate, the first layer having a pore size ranging from greater than 0 to less than 300 nm.

12. The method according to claim 10, wherein the silicon-based resin further comprises porogen and wherein the porogen is removed from the silicon-based resin prior to Step (111).

* * * * *

UNITED STATES PATENT AND TRADEMARK OFFICE
CERTIFICATE OF CORRECTION

PATENT NO. : 10,473,822 B2
APPLICATION NO. : 15/121395
DATED : November 12, 2019
INVENTOR(S) : Fan et al.

It is certified that error appears in the above-identified patent and that said Letters Patent is hereby corrected as shown below:

In the Claims

Correct Claim 11 to read:
11. The method according to claim 10, where in step (II) comprises oxidatively curing and heat treating the silicon-based resin on the substrate to form a first layer disposed on and in direct contact with the substrate, the first layer having a pore size ranging from greater than 0 to less than 300nm.

Correct Claim 12 to read:
12. The method according to claim 10, where in the silicon-based resin further comprises porogen and wherein the porogen is removed from the silicon-based resin prior to step (III).

Signed and Sealed this
Fifth Day of May, 2020

Andrei Iancu
*Director of the United States Patent and Trademark Office*